Figure 1:
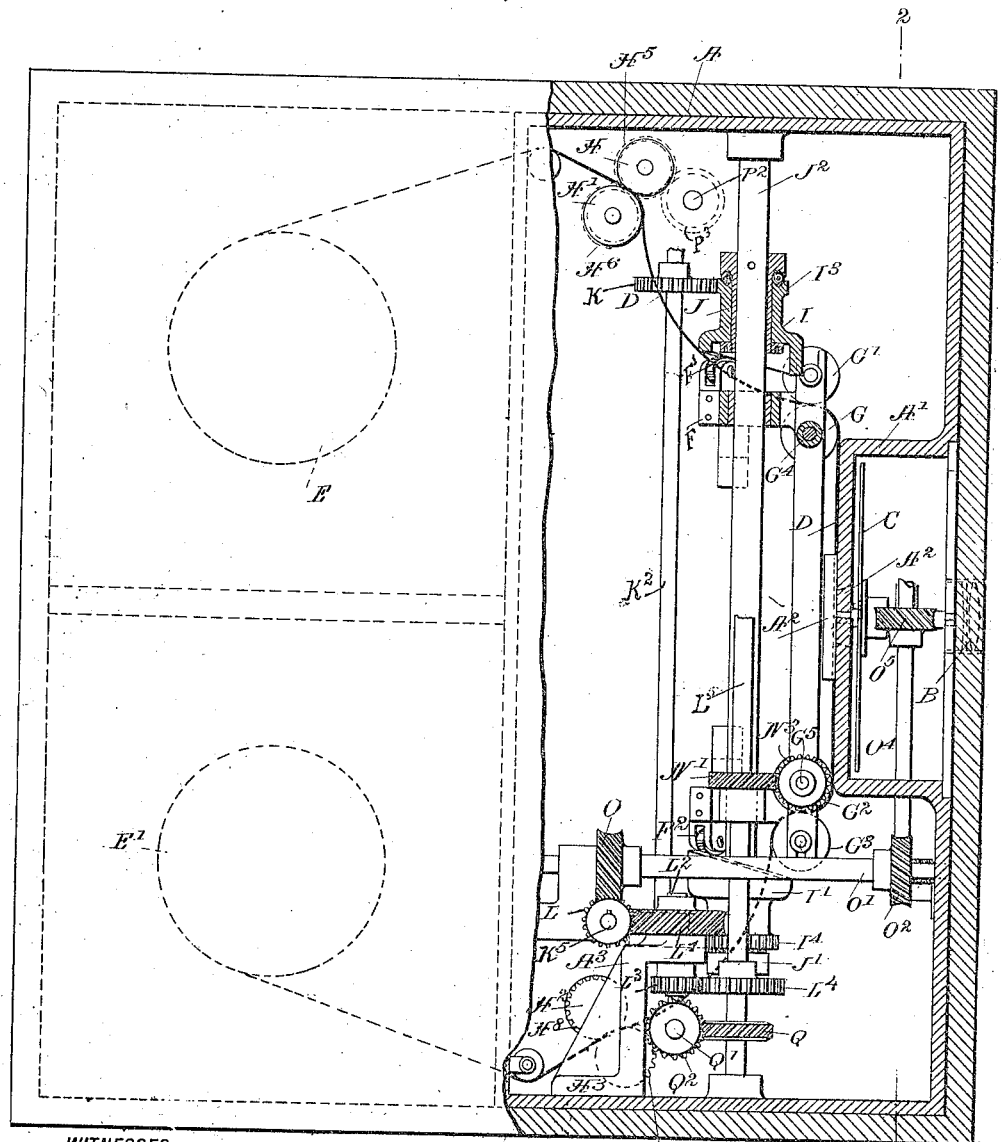

J. URIE.
WEB OR FILM FEEDING MECHANISM.
APPLICATION FILED APR. 5, 1911.

1,043,275.

Patented Nov. 5, 1912.
2 SHEETS—SHEET 1.

WITNESSES

INVENTOR
John Urie
BY
ATTORNEYS

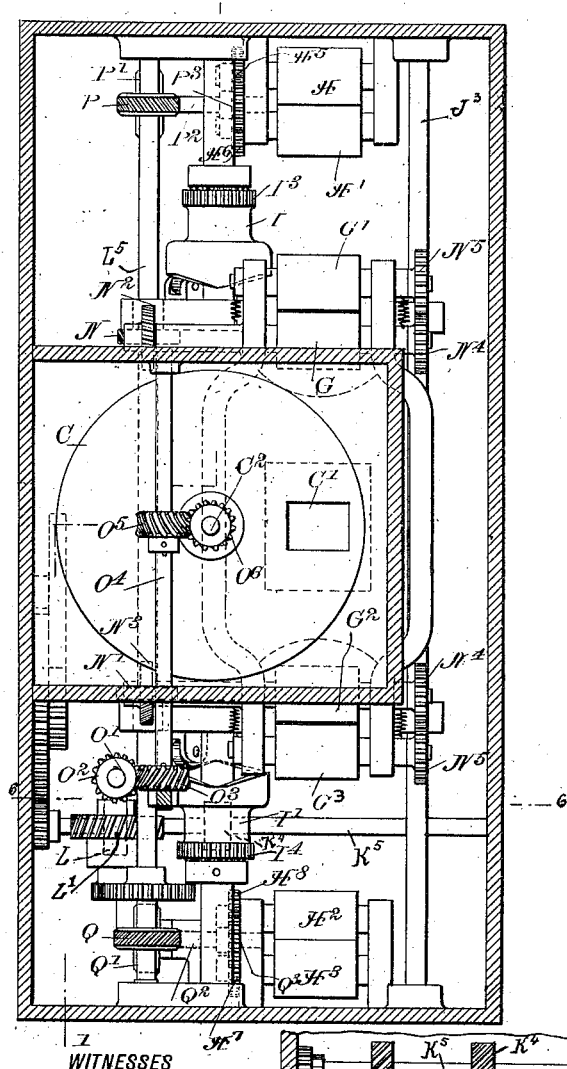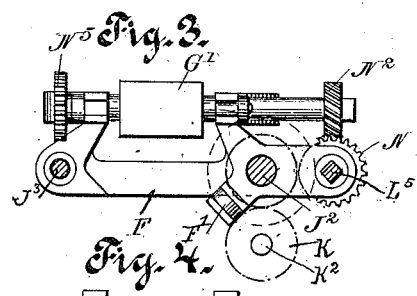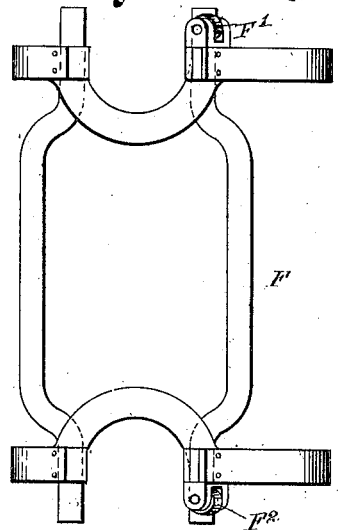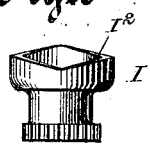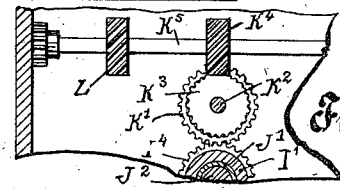

UNITED STATES PATENT OFFICE.

JOHN URIE, OF BAYONNE, NEW JERSEY, ASSIGNOR, BY DIRECT AND MESNE ASSIGNMENTS, TO LUDWIG G. B. ERB AND JOSEPH A. GOLDEN.

WEB OR FILM FEEDING MECHANISM.

1,043,275.   Specification of Letters Patent.   Patented Nov. 5, 1912.

Application filed April 5, 1911. Serial No. 619,030.

*To all whom it may concern:*

Be it known that I, JOHN URIE, a subject of the King of Great Britain, and a resident of Bayonne, in the county of Hudson and State of New Jersey, have invented a new and Improved Web or Film Feeding Mechanism, of which the following is a full, clear, and exact description.

The invention relates to picture making and picture projecting machines, and its object is to provide a new and improved web or film feeding mechanism, arranged to permit proper feeding of the web or film and at the same time allow an accurate taking or projecting of the pictures without jerk or jar of the film or web, thus avoiding the undesirable flicker of the picture projected on the screen as heretofore produced. For the purpose mentioned use is made of a carriage provided with feeding means for the web or film, and a revoluble cam mechanism for imparting reciprocating motion to the said carriage.

A practical embodiment of the invention is represented in the accompanying drawings forming a part of this specification, in which similar characters of reference indicate corresponding parts in all the views.

Figure 1 is a sectional side elevation of the web or film feeding mechanism applied to a camera for taking series pictures, the section being on the line 1—1 of Fig. 2; Fig. 2 is a transverse section of the same on the line 2—2 of Fig. 1; Fig. 3 is a plan view of the carriage; Fig. 4 is a face view of the same; Fig. 5 is a side elevation of one of the revoluble cams for imparting a reciprocating motion to the carriage; and Fig. 6 is a sectional plan view of part of the gearing for rotating the cams, the section being on the line 6—6 of Fig. 2.

The film-feeding mechanism is illustrated as applied to the main frame A of a camera for making series pictures, but it is expressly understood that the film-feeding device may be used on picture-projecting machines or other optical apparatus, without deviating from the invention.

On the main frame A is mounted the lens B opposite an opening $A^2$ in the rear wall of the chamber A' containing a revoluble shutter C, provided with an opening C' adapted to intermittently register with the opening $A^2$, as hereinafter more fully explained. On the outer surface of the wall of the chamber A' is arranged a vertically-disposed guideway $A^2$ for guiding the web or film D past the opening $A^2$, the said web D unwinding from a suitable spool E and winding up on a spool E', the spools being journaled on the main frame A, as indicated in Fig. 1. A carriage F is mounted to reciprocate in a vertical direction in the rear of the chamber A', and on the said carriage F are journaled an upper pair of feed rollers G, G' and a lower pair of feed rollers $G^2, G^3$, for imparting a continuous traveling motion to the web or film D. A pair of driven guide rolls H, H' are mounted on the frame A intermediate the spool E, and the pair of feed rollers G, G', and a similar pair of guide rolls $H^2$, $H^3$ journaled on the lower portion of the main frame A are interposed between the winding up spool E' and the lower pair of feed rollers $G^2, G^3$.

In order to impart and up and down sliding motion to the carriage F, the latter is provided at the top and bottom with friction rollers F, $F^2$ engaged by revoluble cams I and I' mounted to turn on bearings J, J' held on a vertically-disposed guide-rod $J^2$, which in conjunction with another guide rod $J^3$ forms a guideway for the carriage F to slide on in an up and down direction. The cam faces $I^2$ of the cams I and I' are arranged in such a manner that on each revolution of the cams the carriage F is caused to slide up and down an aggregate distance corresponding to the height of a picture of the series of pictures to be produced on the film D. In practice, the pictures are three-quarters of an inch in height, and the cams I, I' are so proportioned that the carriage F is moved three-eighths of an inch on the upstroke and a like distance on the downstroke. The cams I and I' are provided with gear wheels $I^3$, $I^4$, in mesh with gear wheels K, K' attached to a vertically-disposed shaft $K^2$ journaled in suitable bearings arranged on the top and bottom of the main frame A. On the shaft $K^2$ is secured a spiral gear wheel $K^3$ in mesh with a like wheel $K^4$ attached to main shaft $K^5$, connected with a motor or other means for imparting a continuous rotary motion to the shaft $K^5$ which by the gearing just described imparts a rotary motion to the shaft $K^2$ which by the gear wheels K and K' meshing with the gear wheels $I^3$, $I^4$ causes the cams I and I' to rotate in unison, with a view to impart an up and down sliding motion to the carriage F.

On the main shaft K⁵ is secured a spiral gear wheel L in mesh with a similar gear wheel L' secured on a short shaft L² journaled in a bracket A³ attached to the main frame A, and on the shaft L² is secured a gear wheel L³ in mesh with a gear wheel L⁴ secured on a vertical shaft L⁵, journaled in bearings on the main frame A. The shaft L⁵ also forms part of the guideway for the carriage F to slide on up and down. Spiral gear wheels N and N' mounted to turn with and slide on the vertical shaft L⁵ mesh with similar gear wheels N², N³ secured on the shafts G⁴, G⁵, carrying the feed rollers G and G², so that when the shaft L⁵ is rotated a rotary motion is given to the said feed rollers G and G² which in turn rotate their mates G' and G³ by gear wheels N⁴, N⁵ secured on the shafts of the corresponding feed rollers G, G' and G², G³ (see Fig. 2).

The revoluble shutter C is driven from the main shaft K⁵ and for this purpose the following arrangement is made: A spiral gear wheel O is in mesh with the gear wheel L and is secured on a shaft O' journaled on the main frame A and carrying a spiral gear wheel O² in mesh with a similar gear wheel O³ attached to the lower end of a shaft O⁴ extending into the chamber A' and journaled in suitable bearings on the said chamber and the main frame A. On the shaft O⁴ is secured a spiral gear wheel O⁵ in mesh with a similar gear wheel O⁶ secured on the shaft C² of the shutter C, so that when the machine is running a rotary motion is given to the shutter C in unison with the reciprocating motion given to the carriage F and the turning motion given to the pairs of feed rollers G, G' and G², G³. The gearing is so proportioned that during one complete up and down stroke of the carriage F one revolution is given to the shutter C, and the pairs of feed rollers G, G' and G², G³ are turned to feed the web D the distance of the height of a picture, that is three-quarters of an inch. The guide rolls H, H', H², H³ are driven from the shaft L⁵ by suitable gearings arranged as follows: On the upper end of the shaft L⁵ is secured a spiral gear wheel P in mesh with a spiral gear wheel P' secured on a shaft P² carrying a gear wheel P³ in mesh with a gear wheel H⁵ on the guide roll H, and in mesh with a gear wheel H⁶ on the guide roll H'. On the lower end of the shaft L⁵ is secured a spiral gear wheel Q in mesh with a similar gear wheel Q' secured on a shaft Q² carrying a gear wheel Q³ in mesh with a gear wheel H⁷ on the guide roll H² and in mesh with a gear wheel H⁸ on the guide roll H³, so that when the feed rollers G, G', G², G³ and the guide rolls H, H' and H², H³ rotate in unison, a sufficient slack of the web or film D being had between the guide rolls H, H' and the feed rollers G, G', and between the feed rollers G², G³ and the guide rolls H², H³ to compensate for the up and down movement of the carriage F without straining the portions of the web D extending between the guide rolls H, H' and the feed rollers G, G' and that portion of the web which extends between the feed rollers G², G³ and the guide rolls H², H³. When the machine is running and a reciprocating motion is given to the carriage F and a rotating motion to the shutter C, as above explained, then the web or film D is bodily reciprocated with the carriage F and at the same time a continuous traveling motion is given to the web or film. Now during the time that the two speeds are equal and opposite, it is evident that the image on the web or film D, during the total exposure, remains in the same portion of the film, and during this time the opening C' of the shutter C is in register with the said opening A², so that the image is taken or a projection is made of a picture onto a screen. During the down stroke of the carriage F the opening A² is closed by the shutter C, and the next following portion of the web or film D is carried downward in register with the opening A² to permit of taking a second picture or projecting such picture on the upstroke of the carriage F. From the foregoing it will be seen that although a continuous traveling motion is given to the web or film D, each picture is in register with the opening A² during a portion of the upstroke of the carriage F and while the opening A² is in register with the opening C' of the shutter C.

When the mechanism is applied to a camera for taking pictures in series, the web D is sensitized for obtaining proper exposures, and when the feeding mechanism is used in a projecting machine the web with a series of pictures thereon is fed past the opening A² for projecting the pictures onto the screen.

Having thus described my invention, I claim as new and desire to secure by Letters Patent:—

1. A web-feeding mechanism, comprising a carriage mounted to reciprocate and provided with friction rollers, revoluble cams engaging the said friction rollers for imparting a reciprocating motion to the said carriage, pairs of feed rollers mounted on the said carriage for imparting a continuous traveling motion to the web, means for imparting motion to the said cams and feed rollers, a set of guide rollers independent of the said carriage for directing the web to one pair of feed rollers, and a second set of guide rollers independent of the said carriage and receiving the web from the other pair of feed rollers.

2. In combination, an optical apparatus having an exposure opening, a guideway for the passage of the web past the said exposure opening, a revoluble shutter controlling the said opening, a carriage mounted to reciprocate, pairs of feed rollers mounted on the said carriage for continuously feeding the web along the said guideways and past the said exposure opening, friction rollers on the said carriage, revoluble cams engaging the said friction rollers for imparting a reciprocating motion to the said carriage, and means for imparting rotary motion to the said cams, feed rollers, and shutter.

3. In a web feeding mechanism, a reciprocating carriage, revoluble cams for operating the carriage, a pair of feed rollers mounted in each end of the carriage, and means for operating each pair of feed rollers.

4. In a web feeding mechanism, a frame, a reciprocating carriage mounted in the frame, revoluble cams for operating the carriage, a pair of feed rollers mounted in each end of the carriage, means for operating each pair of feed rollers, a pair of guide rollers at the top and bottom of the frame, and means for operating the guide rollers.

5. In a web feeding mechanism, a reciprocating carriage, revoluble cams for operating the carriage, a pair of feed rollers mounted in each end of the carriage, the rollers of each pair of rollers being geared together, and gearing for operating one roller of each pair of rollers.

6. In a web feeding mechanism, a reciprocating carriage, means for operating the carriage, a pair of feed rollers mounted in each end of the carriage, the rollers of each pair of rollers being geared together, a gear wheel on the shaft of one feed roller of each pair of feed rollers, a revoluble shaft, and gear wheels mounted to slide on said shaft and meshing with the gear wheels of the feed rollers.

7. In a web feeding mechanism, a frame, a reciprocating carriage mounted in the frame, means for operating the carriage, a pair of feed rollers mounted in each end of the carriage, the rollers of each pair of rollers being geared together, a shaft, means for operating each pair of feed rollers from the said shaft, a pair of guide rollers at the top and bottom of the frame, and means for operating the pairs of guide rollers from the said shaft.

8. In a web feeding mechanism, a reciprocating carriage, a pair of feed rollers mounted in each end of the carriage, a revoluble shutter, a driven shaft, and means for operating the carriage, each pair of feed rollers and the shutter from said shaft.

9. In a web feeding mechanism, a reciprocating carriage, a pair of feed rollers mounted in each end of the carriage, a driven shaft, means for operating the carriage and each pair of feed rollers from the said shaft, a revoluble shutter, a horizontal shaft operated from the driven shaft, and a vertical shaft geared with the horizontal shaft and the shutter.

In testimony whereof I have signed my name to this specification in the presence of two subscribing witnesses.

JOHN URIE.

Witnesses:
 THEO. G. HOSTER,
 PHILIP D. ROLLHAUS.